United States Patent [19]

Ajima

[11] Patent Number: 5,838,330
[45] Date of Patent: Nov. 17, 1998

[54] SCENERY DISPLAYING SYSTEM FOR DISPLAYING A SCENERY FROM AN ARBITRARY POSITION

[75] Inventor: Takumi Ajima, Zama, Japan

[73] Assignee: Matsushita Electric Industrial Co., Ltd., Osaka, Japan

[21] Appl. No.: 588,892

[22] Filed: Jan. 19, 1996

[30] Foreign Application Priority Data

Jan. 23, 1995 [JP] Japan .................................. 7-007792

[51] Int. Cl.$^6$ .................................................. G06T 15/20
[52] U.S. Cl. .......................................................... 345/427
[58] Field of Search .................................... 395/119, 118, 395/127, 123, 124, 125, 129

[56] References Cited

U.S. PATENT DOCUMENTS

| | | | |
|---|---|---|---|
| 5,577,175 | 11/1996 | Naka et al. ............................... | 395/127 |
| 5,619,628 | 4/1997 | Fujita et al. ............................. | 395/127 |
| 5,651,674 | 7/1997 | Artwick ................................. | 395/127 X |
| 5,651,676 | 7/1997 | Artwick ................................. | 345/427 X |

Primary Examiner—Cliff N. Vo
Attorney, Agent, or Firm—Pollock, Vande Sande & Priddy

[57] ABSTRACT

A scenery from a first position in which contours of natural formations such as mountains, seas, lakes, basins, wide green areas and the like, contours of artificial structures such as buildings, towers, famous temples, schools and the like, a starry sky including stars and constellations, names of administrative regions such as cities, towns and the like, names of the natural formations and the artificial structures, positions of sunrise, sunset, a propagation locus of a diffracted electric wave and an earth orbital locus of the sun, and populations are indicated is displayed on a displaying unit 21. The first position is input to an input unit, or a current position is detected by a global positioning system as the first position. The scenery is prepared in a scenery displaying apparatus according to scenery information stored in a scenery information storing unit. Also, a specific scenery position is automatically selected from among a plurality of candidates for the specific scenery position by quantitatively estimating visibility fields of a plurality of sceneries in a special scenery position designating unit.

28 Claims, 8 Drawing Sheets

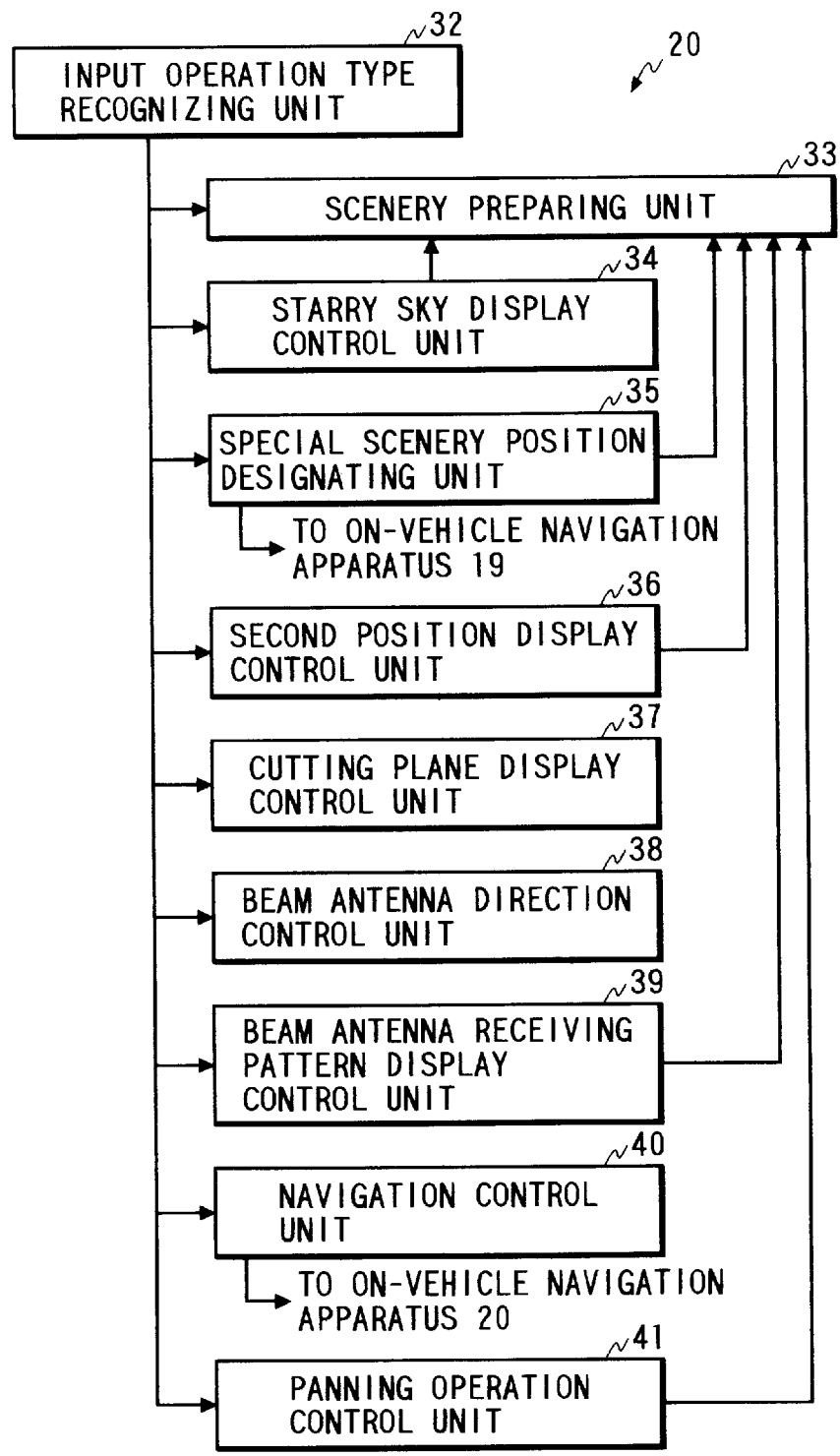

SCENERY DISPLAYING SYSTEM FOR DISPLAYING A SCENERY FROM AN ARBITRARY POSITION

BACKGROUND OF THE INVENTION

1. Field of the Invention

The present invention relates to a scenery displaying system used for an on-vehicle navigation system, a sight-seeing guiding system, a wireless station setting service or the like to display a scenery from an arbitrary position.

2. Description of the Related Art

An on-vehicle navigation system in which a current position is displayed on a planimetric map by operating a current point assuming apparatus in cooperation with an electronic map producing apparatus has received widespread use. The planimetric map is produced by modelling a planimetric landscape such as an aerial photograph obtained by looking down a landscape from just above the current position. Therefore, a relationship in plane position between the current position and a destination can be obviously obtained. However, because the planimetric map is a plan view, it is difficult to imagine a scenery from an arbitrary position.

A scenery guide formed by combining a scenery from a sight-seeing spot and a sundial is often put on an observation platform of the sight-seeing spot. In the scenery guide, sceneries in the four cardinal directions are explained. For example, shapes of mountains, names of the mountains, heights of the mountains, names of plains and basins and names of seas and lakes can be ascertained by comparing the mountains, plains, basins, seas and lakes drawn in the scenery guide with those actually viewed. Therefore, a tourist can imagine a scenery from a sight-seeing spot in cases where a scenery guide is prepared.

Also, in cases where a set-up position of a wireless station or a relay station for a wireless station is determined to perform a wireless communication service for many and unspecified persons, not only conditions that the construction of the wireless or relay station and the possession of land for the wireless or relay station can be easily performed are required, but also a place from which a lot of people can get waves from the wireless or relay station is required as the set-up position. Therefore, a place with a fine visibility is determined as the set-up position of the wireless or relay station. In this case, an applied area of the wireless communication service is determined while examining a contour map.

Also, in case of an astronomical observation, a star chart is often used to easily indicate a positional relationship among stars by specifying a current position and a current time. The star chart is manufactured as follows. A plurality of circular thick papers are piled up to have the same center. In each of the circular thick papers, a positional scale mark, a date scale mark or a time scale mark is drawn. Therefore, when the papers are rotated by predetermined angles specified by current position, date and time, a plurality of stars are indicated in a semi-circular window.

PROBLEMS TO BE SOLVED BY THE INVENTION

However, though a tourist can imagine a scenery from a sight-seeing spot in cases where a scenery guide is put on an observation platform of the sight-seeing spot, the tourist cannot imagine another scenery from a different position when he moves to the different position. Also, the scenery guide placed at a predetermined spot is not useful for a vehicle driver. Therefore, it is required that the vehicle driver assume a scenery from his current position by looking at a planimetric map or an electronic map. To avoid this drawback, it is a great convenience if a tourist or driver can always see scenery from any position.

Also, in the case of the scenery guide, scenery obtained by the tourist or driver is limited to that from his current position. Therefore, the tourist or driver cannot get scenery from a position different from his current position. To avoid this drawback, it is a great convenience to indicate scenery from an arbitrary position.

Also, in cases where the vehicle driver assumes scenery by looking at a planimetric map or an electronic map, it is difficult to determine a place with a fine view. To avoid this drawback, it is a great convenience to automatically determine a place with a fine view by numerically estimating an excellent degree of scenery.

Also, in cases where a tourist or driver intends to look up at a starry sky while using the star chart, when it is cloudy, the star chart is not useful. Also, in cases where his direction is not obvious, he cannot use the star chart. To avoid this drawback, it is a great convenience that a ground scenery is automatically displayed with a starry sky.

Also, in cases where a set-up position of the wireless or relay station is determined, it is difficult to determine a place with a fine visibility by using a contour map. To avoid this drawback, it is a great convenience to numerically estimate a place with a fine visibility.

SUMMARY OF THE INVENTION

An object of the present invention is to provide, with due consideration to the drawbacks of such a conventional scenery displaying system, a scenery displaying system in which scenery from an arbitrary position is displayed, a position with a special visibility is automatically determined or a starry sky is displayed with a ground scenery.

The object is achieved by the provision of a scenery displaying system, comprising:
 position receiving means for receiving a first position;
   scenery information storing means for storing scenery information;
 scenery display control means for preparing scenery from the first position received by the position receiving means according to the scenery information stored in the scenery information storing means; and
 scenery displaying means for displaying the scenery prepared by the scenery display control means.

In the above configuration, scenery information relating to three-dimensional geographical features of the ground, three-dimensional shapes of artificial structures and the like is stored in the scenery information storing means. When a first position is received by the position receiving means, scenery from the first position is prepared by the scenery display control means according to the scenery information and is displayed by the scenery displaying means.

Accordingly, scenery from an arbitrary position is displayed, and an operator such as a tourist or a driver can entertain the scenery.

It is preferred that the scenery displaying system further comprise:
 starry sky information storing means for storing starry sky information;
 date and time inputting means for inputting a particular date and time; and starry sky display control means for controlling the preparation of the scenery performed by the scenery preparing means to display the scenery in which a starry sky indicated by the starry sky information exits. The starry sky information is stored in the starry sky information storing means for the particular date and time input by the date and time inputting means.

In the above configuration, because positions of stars are determined by specifying a date and time, in cases where a particular date and time is specified, a starry sky indicated by the starry sky information is indicated in the scenery by the starry sky display control means. Accordingly, a starry sky can be displayed with ground scenery.

Also, it is preferred that the scenery displaying system further comprise:

population density storing means for storing a density of population for each of unit areas;

visibility field extracting means for extracting a visibility field, which is defined as a land directly viewed from the first position received by the first position receiving means, from the scenery prepared by the scenery preparing means;

visibility angle area calculating means for calculating a visibility angle area of the visibility field extracted by the visibility field extracting means and dividing the visibility angle area into a plurality of unit visibility angle areas, the visibility angle area being defined as a product of a horizontal visibility angle at the first position in a horizontal direction and a perpendicular visibility angle at the first position in a perpendicular direction;

unobstructed view distance calculating means for calculating an unobstructed view distance between the first position and a portion of the visibility field corresponding to one unit visibility angle area according to the scenery information stored in the scenery information storing means for each of the unit visibility angle areas obtained by the visibility angle area calculating means;

population calculating means for calculating a population by multiplying one unit visibility angle area obtained by the visibility angle area calculating means, one corresponding unobstructed view distance calculated by the unobstructed view distance calculating means and one corresponding density of population stored in the population density storing means together for each of the unit visibility angle areas and calculating a total population in the visibility field by adding up the populations for the unit visibility angle areas; and population display control means for controlling the preparation of the scenery performed by the scenery preparing means to display the scenery in which the total population calculated by the population calculating means is indicated.

In the above configuration, a visibility field is extracted from the scenery by the visibility field extracting means, and a visibility angle area of the visibility field is calculated and divided into a plurality of unit visibility angle areas by the visibility angle area calculating means. Therefore, a portion of the visibility field corresponds to one unit visibility angle area. Thereafter, a plurality of unobstructed view distances between the first position and portions of the visibility field corresponding to the unit visibility angle areas are calculated by the unobstructed view distance calculating means according to the scenery information. Thereafter, one unit visibility angle area, one unobstructed view distance and one density of population are multiplied together by the population calculating means to obtain a population for each of the unit visibility angle areas, and a total population of the visibility field is calculated by adding up the populations for the unit visibility angle areas. Thereafter, the total population is indicated in the scenery by the population display control means.

Accordingly, the population can be indicated in the scenery. Also, it is preferred that the scenery displaying system further comprise:

population density storing means for storing a density of population for each of unit areas;

special scenery position candidate setting means for setting a plurality of candidates for a special scenery position, a plurality of inspected sceneries from the inspected positions being prepared by the scenery preparing means;

visibility field extracting means for extracting a visibility field, which is defined as a land directly viewed from each of the inspected positions set by the special scenery position candidate setting means, from each of the inspected sceneries;

visibility angle area calculating means for calculating a plurality of visibility angle areas of the visibility fields extracted by the visibility field extracting means and dividing each of the visibility angle areas into a plurality of unit visibility angle areas, each of the visibility angle areas at the inspected positions being defined as a product of a horizontal visibility angle in a horizontal direction and a perpendicular visibility angle in a perpendicular direction;

unobstructed view distance calculating means for calculating an unobstructed view distance for one unit visibility angle area between one inspected position corresponding to the unit visibility angle area and a portion of one visibility field corresponding to the unit visibility angle area according to the scenery information stored in the scenery information storing means for each of the unit visibility angle areas obtained by the visibility angle area calculating means;

population calculating means for calculating a population by multiplying one unit visibility angle area obtained by the visibility angle area calculating means, one corresponding unobstructed view distance calculated by the unobstructed view distance calculating means and one corresponding density of population stored in the population density storing means together for each of the unit visibility angle areas and calculating a total population by adding up the populations for the unit visibility angle areas of one visibility angle area for each of the inspected positions;

special scenery position selecting means for selecting a particular inspected position corresponding to a maximum total population among the total populations calculated by the population calculating means as the special scenery position from among the inspected positions; and population display control means for controlling the preparation of the scenery performed by the scenery preparing means to display the scenery viewed from the special scenery position selected by the special scenery position selecting means in which the maximum total population calculated by the population calculating means is indicated.

In the above configuration, a plurality of candidates for a special scenery position are set by the special scenery position candidate setting means as a plurality of inspected positions, and a plurality of inspected sceneries from the inspected positions are prepared by the scenery preparing means. Thereafter, a total population of the visibility field is calculated for each of the sceneries in the same manner. Thereafter, a particular inspected position corresponding to a maximum total population is selected as the special scenery position by the special scenery position selecting means, and the scenery viewed from the special scenery position is indicated under control of the population display control means.

Accordingly, an operator can quantitatively estimate the scenery, and the operator can determine a special scenery position, for example, appropriate as a set-up position of a wireless or relay station because the scenery viewed from a special scenery position displays a thickly populated area.

Also, because a special scenery position is automatically selected from a plurality of candidates for the special scenery position, the special scenery position can be determined at high speed.

Also, it is preferred that the scenery displaying system further comprise:

special scenery position candidate setting means for setting a plurality of candidates for a special scenery position as a plurality of inspected positions, a plurality of inspected sceneries from the inspected positions being prepared by the scenery preparing means;

visibility field extracting means for extracting a visibility field, which is defined as a natural formation directly viewed from each of the inspected positions set by the special scenery position candidate setting means, from each of the inspected sceneries;

visibility angle area calculating means for calculating a plurality of visibility angle areas of the visibility fields extracted by the visibility field extracting means, each of the visibility angle areas at the inspected positions being defined as a product of a horizontal visibility angle in a horizontal direction and a perpendicular visibility angle in a perpendicular direction;

special scenery position selecting means for selecting a particular inspected position corresponding to a maximum visibility angle area among the visibility angle areas calculated by the visibility angle area calculating means as the special scenery position from among the inspected positions; and special scenery position display control means for controlling the preparation of the scenery performed by the scenery preparing means to display the scenery viewed from the special scenery position selected by the special scenery position selecting means.

In the above configuration, a plurality of visibility angle areas of visibility fields for a plurality of inspected sceneries are calculated by the visibility angle area calculating means in the same manner. Thereafter, a particular inspected position corresponding to a maximum visibility angle area is selected as the special scenery position by the special scenery position selecting means, and the scenery viewed from the special scenery position is displayed under control of the special scenery position display control means.

Accordingly, an operator can quantitatively estimate the scenery. Also, in cases where the operator intends to take a rest at a resting position for the purpose of viewing a visibility field such as a sea area, the operator can entertain or examine in advance a scenery viewed from a special scenery position with an excellent scenery because an area of the visibility field occupied in the scenery is maximum.

Also, it is preferred that the scenery displaying system further comprise:

special scenery position candidate setting means for setting a plurality of candidates for a special scenery position as a plurality of inspected positions, a plurality of inspected sceneries from the inspected positions being prepared by the scenery preparing means;

visibility field extracting means for extracting a visibility field, which is defined as a natural formation directly viewed from each of the inspected positions set by the special scenery position candidate setting means, from each of the inspected sceneries;

visibility angle area calculating means for calculating a plurality of visibility angle areas of the visibility fields extracted by the visibility field extracting means and dividing each of the visibility angle areas into a plurality of unit visibility angle areas, each of the visibility angle areas at the inspected positions being defined as a product of a horizontal visibility angle in a horizontal direction and a perpendicular visibility angle in a perpendicular direction;

unobstructed view distance calculating means for calculating an unobstructed view distance for one unit visibility angle area between one inspected position corresponding to the unit visibility angle area and a portion of one visibility field corresponding to the unit visibility angle area according to the scenery information stored in the scenery information storing means for each of the unit visibility angle areas obtained by the visibility angle area calculating means;

average unobstructed view distance calculating means for calculating an average of the unobstructed view distances calculated by the unobstructed view distance calculating means and corresponding to one visibility angle area for each of the visibility angle areas;

special scenery position selecting means for selecting one inspected position corresponding to a maximum average among the averages calculated by the average unobstructed view distance calculating means as the special scenery position from among the inspected positions; and special scenery position display control means for controlling the preparation of the scenery performed by the scenery preparing means to display the scenery viewed from the special scenery position selected by the special scenery position selecting means.

In the above configuration, a plurality of visibility angle areas of visibility fields for a plurality of inspected sceneries are calculated by the visibility angle area calculating means, and each of the visibility angle areas is divided into a plurality of unit visibility angle areas in the same manner. Thereafter, an unobstructed view distance from one inspected position to a portion of one visibility field corresponding to one unit visibility angle area is calculated for each of the unit visibility angle areas by the unobstructed view distance calculating means, and an average of the unobstructed view distances is calculated for each of the visibility angle areas by the average unobstructed view distance calculating means. Thereafter, one inspected position corresponding to a maximum average is selected as the special scenery position by the special scenery position selecting means, and the scenery viewed from the special scenery position is displayed under control of the special scenery position display control means.

Accordingly, an operator can quantitatively estimate the scenery. Also, in cases where the operator intends to take a rest at a resting position for the purpose of viewing a visibility field such as a mountainous area or a green area, the operator can entertain or examine in advance a scenery viewed from a special scenery position with an excellent scenery because an unobstructed view distance for the visibility field occupied in the scenery is maximum.

Also, the object is achieved by the provision of a scenery displaying system, comprising:

first position receiving means for receiving a first position;

scenery information storing means for storing scenery information;

scenery display control means for controlling display of a scenery viewed from the first position received by the first position receiving means according to the scenery information stored in the scenery information storing means; and scenery displaying means for displaying the scenery under control of the scenery display control means, the scenery display control means comprising natural formation adding means for adding one or more contours of natural formations to the scenery;

artificial structure adding means for adding one or more contours of artificial structures to the scenery; and name adding means for adding one or more names of the natural formations, the artificial structures and administrative regions to the scenery, the scenery in which the contours of the natural formations added by the natural formation adding means, the contours of the artificial structures added by the artificial structure adding means and the names added by the name adding means are indicated being displayed by the scenery displaying means.

In the above configuration, a scenery viewed from a first position is displayed by the scenery displaying means under control of the scenery display control means. In this case, one or more contours of natural formations, one or more contours of artificial structures and one or more names of the natural formations, the artificial structures and administrative regions are added to the scenery.

Accordingly, a scenery from an arbitrary position can be displayed, and the natural formations, the artificial structures can be indicated in the scenery. Also, the names of the natural formations, the artificial structures and administrative regions can be indicated in the scenery to identify the natural formations and the artificial structures.

BRIEF DESCRIPTION OF THE DRAWINGS

The objects, features and advantages of the present invention will be apparent from the following description taken in conjunction with the accompanying drawings, in which:

FIG. 3 is a block diagram of a scenery displaying apparatus composed of an on-vehicle navigation apparatus and a scenery display control unit shown in FIG. 1;

DETAIL DESCRIPTION OF THE EMBODIMENTS

Preferred embodiments of a scenery displaying system according to the present invention are described with reference to the drawings.

Figure 1:
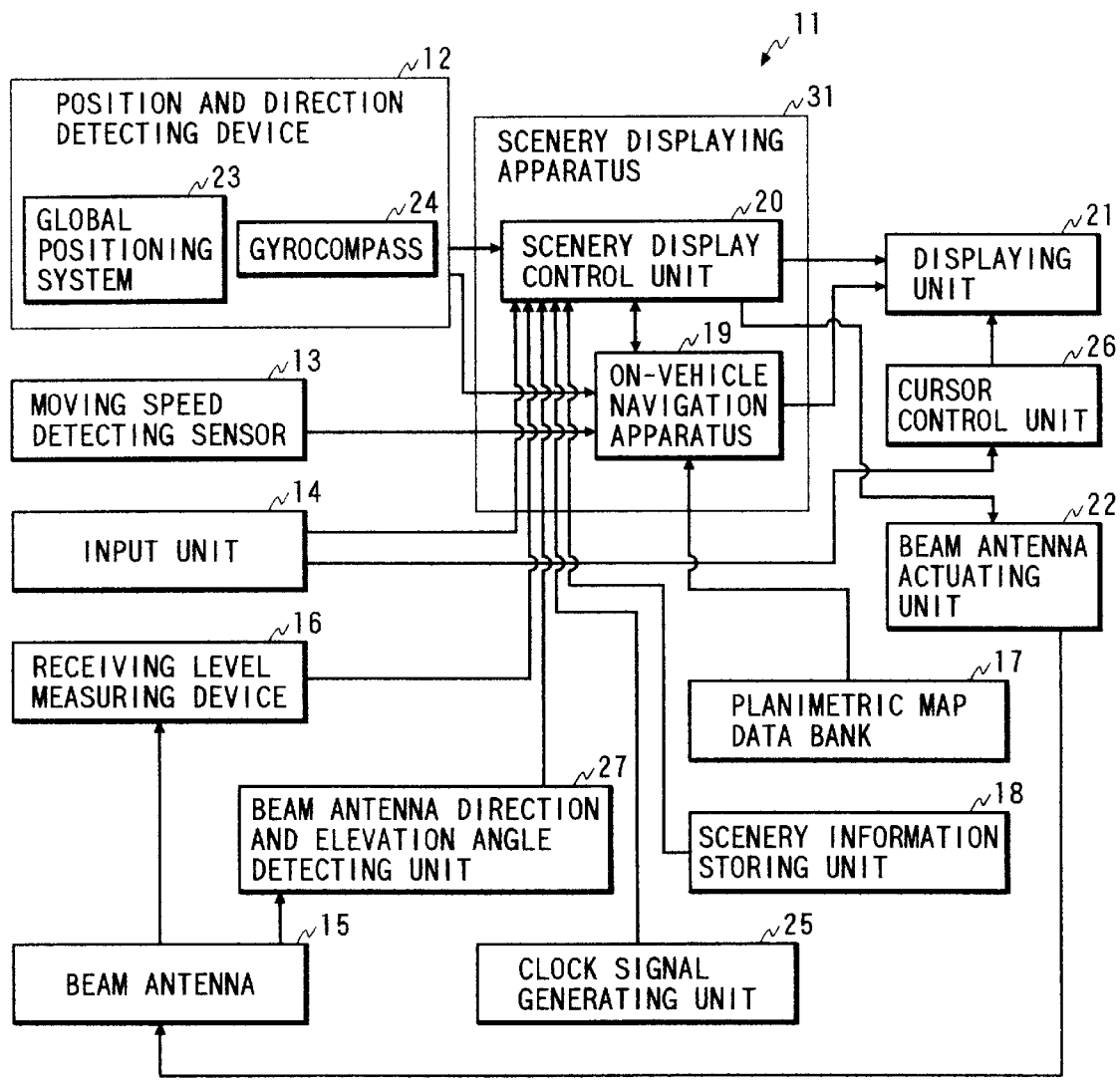
FIG. 1 is a block diagram of a scenery displaying system according to an embodiment of the present invention.

FIG. 1 is a block diagram of a scenery displaying system according to an embodiment of the present invention.

As shown in FIG. 1, a scenery displaying system 11 comprises a position and direction detecting device 12 for detecting a current position of a vehicle or a tourist and a moving direction of the vehicle or tourist, a moving speed detecting sensor 13 for detecting a moving speed of the vehicle, an input unit 14 for inputting a first position, a second position, a scenery direction, a selected operation, a selected area type and position data indicating one or more candidates for a resting point or a particular road, a beam antenna 15 for receiving an electric wave transmitted from an opposite station placed at a second position. In addition, a receiving level measuring device 16 measures a level of the electric wave received by the beam antenna 15, a planimetric map data bank 17 stores pieces of planimetric map data, a scenery information data bank 18 for stores pieces of scenery information, an on-vehicle navigation apparatus 19 functioning as a planimetric map preparing unit prepares a planimetric map and current positional information according to the planimetric map data stored in the planimetric map data bank 17. The current position and the moving direction is detected by the position and direction detecting device 12 and the moving speed is detected by the moving speed detecting sensor 13. A scenery display control unit 20 controls the display of a scenery viewed from the current position detected by the detecting device 12 or the first position input to the input unit 14 according to the scenery information stored in the scenery information data bank 18 and the level of the electric wave measured by the receiving level measuring device 16 (if required). A displaying unit 21 for displaying the planimetric map prepared by the navigation apparatus 19 and a position mark indicating the current position of the vehicle according to the current positional information prepared by the on-vehicle navigation apparatus 19 and displays the scenery under control of the scenery display control unit 20. A beam antenna actuating unit 22 actuates beam antenna 15 under control of the scenery display control unit 20, a clock signal generating unit 25 generates a clock signal indicating current date and time to inform the scenery display control unit 20 of the current date and time. Also a cursor control unit 26 controls a cursor displayed on the displaying unit 21 according to the position data input to the input unit 14 to inform the scenery display control unit 20 of one or more candidates for a resting point or a particular road specified by an operator. A beam antenna direction and elevation angle detecting unit 27 detects a compass direction and an elevation angle of the beam antenna 15.

The position and direction detecting device 12 comprises a global positioning system 23 for detecting the current position of the vehicle on the earth by using electric waves transmitted from a plurality of global positioning system (GPS) satellites, and a gyrocompass 24 for detecting a rotational angle speed and obtaining the moving direction of the vehicle by integrating a plurality of rotational angle speeds detected one after another. The input unit 14 is embodied by a keyboard, a speech recognition device, a mouse or an external interface. This embodiment is not limited to the gyrocompass 24. For example, a geomagnetic detector is useful in place of the gyrocompass 24.

Figure 2:
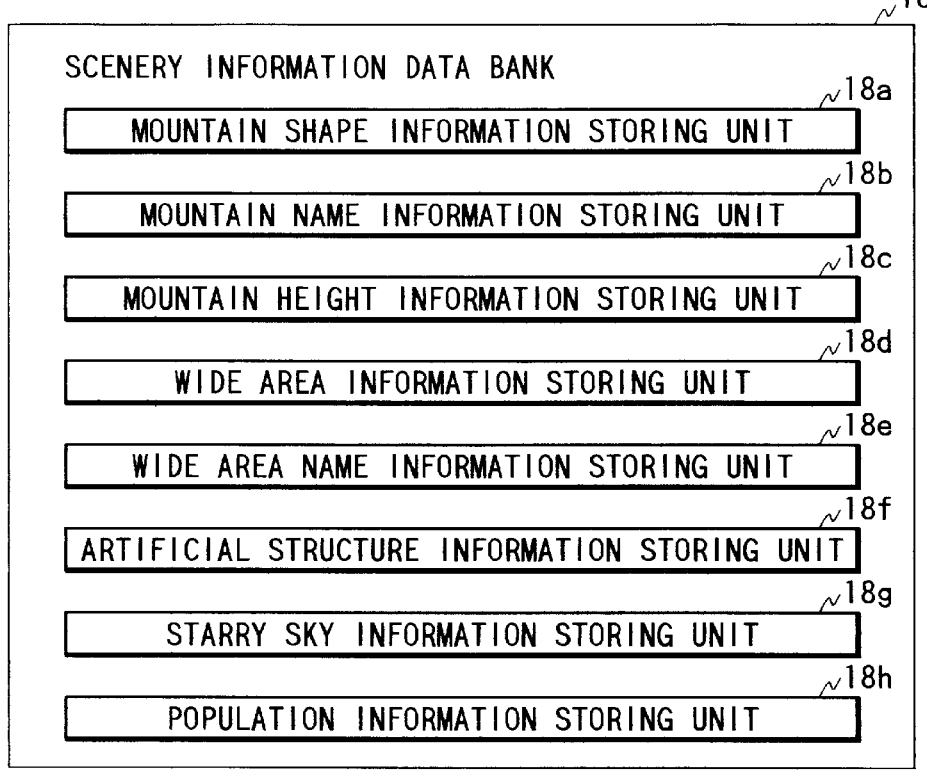
FIG. 2 is a block diagram of a scenery information storing unit shown in FIG. 1.

As shown in FIG. 2, the scenery information data bank 18 comprises a mountain shape information storing unit 18*a* for storing pieces of mountain shape information indicating three-dimensional shapes and positions of various mountains, a mountain name information storing unit 18*b* for storing pieces of mountain name information indicating a plurality of names of the mountains, a mountain height information storing unit 18*c* for storing pieces of mountain height information indicating a plurality of heights of the mountains above the sea level. Also a wide area information storing unit 18*d* stores pieces of wide area information indicating three-dimensional shapes and positions of a plurality of wide areas representing plains, basins, seas, lakes, wide green areas, cities, towns and the like. A wide area name information storing unit 18*e* for storing pieces of wide area name information indicating names of the wide areas, an artificial structure information storing unit 18*f* for storing pieces of artificial structure information indicating positions and names of a plurality of artificial structures representing high buildings, towers, famous temples, schools and the like. Also a starry sky information storing unit 18*g* for storing pieces of starry sky information indicating positions of a plurality of stars, apparent magnitudes of the stars, patterns of a plurality of constellations, names of the constellations with respect to observational positions, dates and times, a starry sky information storing unit 18*g* for storing pieces of earth orbital locus information for the sun with respect to observational positions, dates and times, and a population information storing unit 18*h* for storing pieces of population information respectively indicating density of population at a unit area are stored as the scenery information. The mountains, the plains, the basins, the seas, the lakes, the wide green areas and the like are classified as natural formations, and the cities, the towns and the like are classified as administrative regions. In the mountain shape information for each mountain, pieces of contour line information (or height information) are included to store a three-dimensional shape of the mountain. It is preferred that pieces of artificial structure shape information indicating three-dimensional shapes of the artificial structures be additionally stored in the data bank 18, if required.

FIG. 3 is a block diagram of a scenery displaying apparatus composed of the on-vehicle navigation apparatus 19 and the scenery display control unit 20 in which a navigating operation, a scenery displaying operation, a starry sky displaying operation, a special scenery position designating operation, a second position indicating operation, a cutting plane displaying operation, a beam antenna direction adjusting operation and a beam antenna receiving pattern measuring operation are separately performed.

As shown in FIG. 1, a scenery displaying apparatus 31 of the scenery displaying system 11 comprises the on-vehicle navigation apparatus 19 and the scenery display control unit 20. As shown in FIG. 3, the scenery display control unit 20 comprises an input operation type recognizing unit 32 for recognizing one or more types of operations input to the input unit 14 from among a navigating operation, a scenery displaying operation, a starry sky displaying operation, a special scenery position designating operation, a second position indicating operation, a cutting plane displaying operation, a beam antenna direction adjusting operation and a beam antenna receiving pattern measuring operation, a scenery preparing unit 33 for preparing the scenery viewed from the current or first position in cases where the selection of the scenery displaying operation or the starry sky displaying operation is recognized by the input operation type recognizing unit 32, a starry sky display control unit 34 for controlling the preparation of the scenery performed by the scenery preparing unit 33 to display the scenery in which a starry sky is indicated with a ground scenery prepared by the scenery preparing unit 33 according to the starry sky information stored in the scenery information storing unit 18 in cases where the selection of the starry sky displaying operation is recognized by the input operation type recognizing unit 32. Also a special scenery position designating unit 35 controls the preparation of the scenery performed by the scenery preparing unit 33 to display the scenery in which a special scenery position is indicated in cases where the selection of the special scenery position designating operation is recognized by the input operation type recognizing unit 32. A second position display control unit 36 controls the preparation of the scenery performed by the scenery preparing unit 33 to display the scenery in which a second position is indicated in cases where the selection of the second position indicating operation is recognized by the input operation type recognizing unit 32. Also, a cutting plane display control unit 37 controls the preparation of the scenery performed by the scenery preparing unit 33 to display a perpendicularly cutting plane on the displaying unit 21 in cases where the selection of the cutting plane displaying operation is recognized by the input operation type recognizing unit 32, a beam antenna direction control unit 38 for controls the adjustment of a direction of the beam antenna 15 in cases where the selection of the beam antenna direction adjusting operation is recognized by the input operation type recognizing unit 32, a beam antenna receiving pattern display control unit 39 controls the display of a level pattern of electric waves received by the beam antenna 15 in cases where the selection of the beam antenna receiving pattern measuring operation is recognized by the input operation type recognizing unit 32. An addition, a navigation control unit 40 controls the on-vehicle navigation apparatus 19 in cases where the selection of the navigating operation is recognized by the input operation type recognizing unit 32, and a panning operation control unit 41 controls a panning operation of the scenery displayed on the displaying unit 21.

Figure 4:
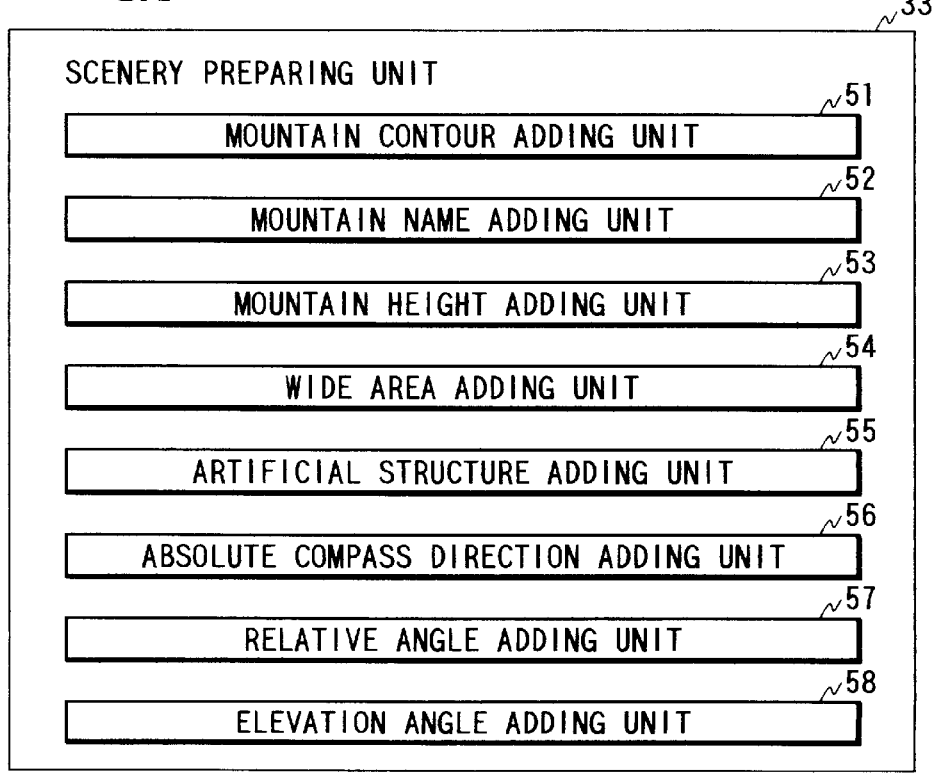
FIG. 4 is a block diagram of a scenery preparing unit included in the scenery display control unit shown in FIG. 3.

FIG. 4 is a block diagram of the scenery preparing unit 33.

As shown in FIG. 4, the scenery preparing unit 33 comprises a mountain contour adding unit 51 for adding contours of one or more mountains to a scenery from the current position detected by the detecting device 12 or the first position input to the input unit 14 according to the mountain shape information stored in the scenery information data bank 18 to display the scenery including the mountains on the displaying unit 21. Also, a mountain name adding unit 52 adds one or more names of the mountains to the scenery according to the mountain name information stored in the scenery information data bank 18 to display the scenery including the mountain names on the displaying unit 21, a mountain height adding unit 53 for adding one or more mountain heights of the mountains to the scenery according to the mountain height information stored in the scenery information data bank 18 to display the scenery including the heights of the mountains on the displaying unit 21, a wide area adding unit 54 for adding one or more wide areas and those names to the scenery according to the wide area information and the wide area name information stored in the scenery information data bank 18 to display the scenery including the wide areas on the displaying unit 21. Also, an artificial structure adding unit 55 adds one or more artificial structures to the scenery according to the artificial structure information stored in the scenery information data bank 18 to display the scenery including the artificial structures on the displaying unit 21, an absolute compass direction adding unit 56 adds a character denoting an absolute compass direction such as north, south, east and west to the scenery to indicate the moving direction detected by the detecting device 12 or the scenery direction input to the input unit 14 by the absolute compass direction. Also, a relative angle adding unit 57 adds a plurality of numerical characters respectively denoting a relative horizontal angle defined as a horizontally shifting angle from the absolute compass direction denoting the moving direction, (or the scenery direction) to the scenery to display the scenery including the relative horizontal angles on the displaying unit 21, and an elevation angle adding unit 58 adds a plurality of elevation angles defined as perpendicularly shifting angles from a horizontal direction to the scenery to display the scenery including the elevation angles on the displaying unit 21.

Figure 5:
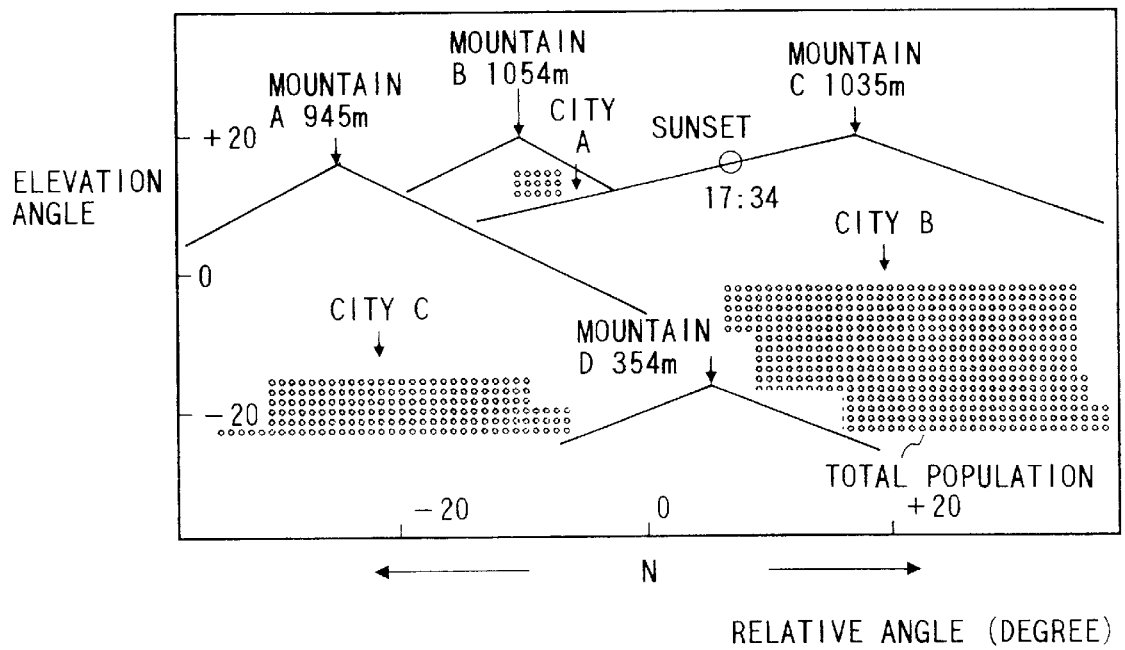
FIG. 5 is a first example of a scenery shown by the scenery displaying system shown in FIG. 1.

In the above configuration, in cases where the scenery displaying operation is selected by an operator such as a driver or a tourist, the selection of the scenery displaying operation is recognized by the input operation type recognizing unit 32, and the scenery preparing unit 33 is operated. Therefore, contours of one or more mountains, names of the mountains, heights of the mountains, one or more wide areas and those names, one or more artificial structures, an absolute compass direction agreeing with the moving direction or the scenery direction, a plurality of relative directions and a plurality of elevation angles are added to a scenery by the adding units 51 to 58, and the scenery is displayed on the displaying unit 21. An example of the scenery is shown in FIG. 5. As shown in FIG. 5, a scale mark is drawn in the bottom of the scenery to indicate the absolute compass direction and the relative horizontal angles, each relative horizontal angle is indicated by a degree unit, each relative horizontal angle in the right direction is indicated by a positive value, and each relative horizontal angle in the left direction is indicated by a negative value. Also, a scale mark is drawn in the left side of the scenery to indicate the elevation angles, each elevation angle is indicated by a degree unit, each elevation angle in the upper direction is indicated by a positive value, and each elevation angle in the lower direction is indicated by a negative value. The horizontal direction and the moving direction (or the scenery direction) are respectively indicated by a zero degree.

Also, in cases where the operator intends to get a scenery which is viewed from a first position, a cursor or a write pen is placed on the first position indicated in a planimetric map which is displayed on the displaying unit 21 by the on-vehicle navigation apparatus 19, and the input unit 14 is manipulated to input the first position.

Also, in cases where the operator intends to get a scenery which is viewed from a first position in a scenery direction, a marking arrow directed in the scenery direction is placed on the first position indicated in a planimetric map which is displayed on the displaying unit 21 by the on-vehicle navigation apparatus 19, and the input unit 14 is manipulated to input the first position and the scenery direction.

Accordingly, because the scenery from the current position or the first position is displayed and a center of the scenery is directed in the moving direction or the scenery direction, a scenery from an arbitrary position and direction can be displayed. Therefore, a scenery from a destination can be checked in advance before the operator goes to the destination, and the scenery can entertain the operator.

Also, because names of mountains, wide areas, seas, rivers, lakes and the like and names of cities and towns are indicated in the scenery, the scenery can be used as a scenery guide. Therefore, even though any scenery guide is not installed in a sight-seeing spot, a tourist can realize names of objects in a scenery when the tourist views the scenery.

Also, because the first position and the scenery direction are input to the input unit 13 while specifying the first position and the scenery direction on the planimetric map, it is not required to directly input positional coordinates of the first position and directional values of the scenery direction. Also, it is not required to look for the second position in the scenery. Therefore, the input of the first position and the scenery direction is not troublesome.

Also, because the planimetric map and the scenery can be arbitrarily displayed, versatile positional information can be expressed.

Also, because the current position is determined by the global positioning system 23 by using the global positioning system (GPS) satellites, the scenery from the current position can be reliably obtained even though the current position is moved.

Also, because a relative horizontal angle with respect to an absolute angle (or a moving direction) is displayed, a scenery direction can be substantially input to the input unit 14 by specifying a relative horizontal angle.

In cases where the scenery ranging in the whole directions (360 degrees) cannot be displayed on the displaying unit 21 when the scenery displaying operation is selected by the operator, a part of the scenery is displayed. For example, a moving direction (or an absolute compass direction) agrees with the north, and a partial scenery ranging from a first relative horizontal angle of −40 degrees to a second relative horizontal angle of +40 degrees is, for example, displayed. That is, a displaying angle range is ±40 degrees. Thereafter, when a panning operation in a clockwise rotation is selected by the operator, the selection of the panning operation is recognized by the input operation type recognizing unit 32, and the panning operation control unit 41 is operated. In detail, a center of the partial scenery directed in the moving direction (or the north) is gradually changed to the north-northeast, the northeast, the east-northeast and the east in that order while maintaining the displaying angle range of ±40 degrees. To perform this panning operation, a whole scenery ranging in the whole directions is produced in advance when the scenery preparing unit 33 is operated, and a display window is gradually changed.

In the above panning operation, the panning operation is manually instructed, and the absolute compass direction is gradually shifted from the moving direction. However, in cases where the absolute compass direction is always fixed to the moving direction obtained by the gyrocompass 24, the panning operation is automatically performed when the operator having the scenery display system 11 turns to another direction. In other words, the absolute compass direction always agrees with a front direction of the operator. Therefore, in cases where the operator having the scenery display system 11 turns at a sight-seeing spot, the panning operation is automatically performed, and a scenery displayed on the displaying unit 21 always agrees with an actual scenery viewed in the front of the operator.

Accordingly, even though the scenery ranging in the whole directions (360 degrees) cannot be displayed on the displaying unit 21, because a whole scenery can be substantially displayed by displaying a series of partial sceneries, the scenery display system 11 is very useful for the operator.

Also, in cases where the absolute compass direction is always fixed to the moving direction obtained by the gyrocompass 24, because a scenery displayed on the displaying unit 21 always agrees with an actual scenery viewed in the front of the operator, the scenery display system 11 is very useful as a scenery guide.

Figure 6:
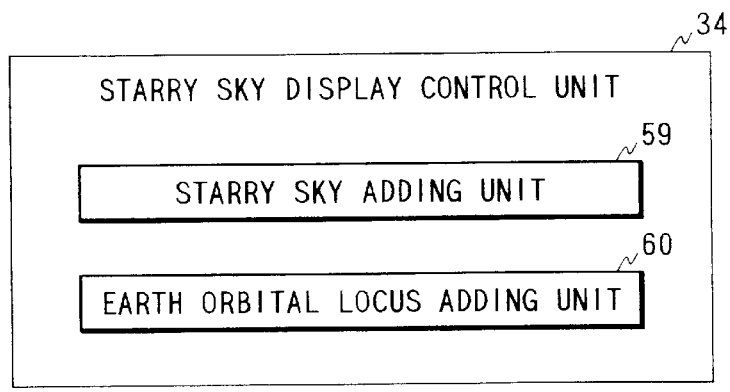
FIG. 6 is a block diagram of a starry sky display control unit included in the scenery display control unit shown in FIG. 3.

FIG. 6 is a block diagram of the starry sky display control unit 34.

As shown in FIG. 6, the starry sky display control unit 34 comprises a starry sky adding unit 59 for adding a starry sky to the scenery according to the starry sky information stored in the scenery information data bank 18 to display the scenery including the starry sky on the displaying unit 21, and an earth orbital locus adding unit 60 for adding an earth orbital locus of the sun to the scenery according to the earth orbital locus information stored in the scenery information data bank 18 and adding a sunset or sunrise time and a position of the sunset or sunrise to the scenery according to the scenery information to display the scenery including the sun, a sunset or sunrise time and a position of the sunset or sunrise on the displaying unit 21.

In the above configuration, in cases where the starry sky displaying operation is selected by the operator, the selection of the starry sky displaying operation is recognized by the input operation type recognizing unit 32, and the scenery preparing unit 33 is operated. Therefore, the scenery including contours of one or more mountains, names of the mountains, heights of the mountains, one or more wide areas and those names, one or more artificial structures, an absolute compass direction denoting the moving direction, a plurality of relative directions and a plurality of elevation angles is displayed as a ground scenery on the displaying unit 21 in the same manner. Also, the starry sky display control unit 34 is operated, and a starry sky and an earth orbital locus of the sun are added to the ground scenery by the adding units 59 and 60 by referring current date and time transmitted from the clock signal generating unit 25 and the current or first position transmitted from the detecting unit 12 or the input unit 14. Therefore, the ground scenery and the starry sky in which positions of a plurality of stars, apparent magnitudes of the stars, patterns of a plurality of constellations and names of the constellations are indicated are displayed together.

In cases where a position on the earth and the current date and time are determined, a starry sky and an earth orbital locus of the sun can be unconditionally determined. Therefore, a starry sky and an earth orbital locus of the sun can be displayed with the ground scenery. In this case, because apparent magnitudes of a plurality of stars, patterns of a plurality of constellations and names of the constellations are displayed with positions of the stars, even though a small number of stars are actually observed, one or more distinguished stars actually observed can be identified by looking the starry sky with the ground scenery displayed.

Also, a sunset or sunrise time and a position of the sunset or sunrise are calculated according to the scenery information by the earth orbital locus adding unit 60 and are displayed on the displaying unit 21. In general, a sunrise time when the sun rises above the horizon and a sunset time when the sun sinks below the horizon are widely announced. In contrast, in this embodiment, a sunset time when the sun is, for example, hidden by a mountain or a sunrise time when the sun, for example, rises above a mountain is calculated and displayed.

Accordingly, because the ground scenery with the starry sky is displayed, names of the stars actually viewed and names and patterns of the constellations actually viewed can be ascertained by referring to the displayed starry sky.

Also, because one or more distinguished stars actually observed can be identified by looking the starry sky with the ground scenery displayed on the displaying unit 21, even though an actual ground scenery cannot be sufficiently viewed at midnight, the scenery display system 11 can be useful by looking for one or more distinguished stars actually viewed.

Also, because a sunset or sunrise time and a position of the sunset or sunrise are calculated by the earth orbital locus adding unit 60 and are displayed, the operator can easily make a driving plan to actually view a sunset or sunrise at the desired time and position.

Also, because a sunset or sunrise time and a position of the sunset or sunrise are calculated according to the scenery information, an actual sunset or sunrise time can be correctly obtained.

Also, because current date and time is automatically obtained by the clock signal generating unit 25, the starry sky at the current date and time can be easily obtained. In this case, a clock may be installed in the unit 25, or the unit 25 may receives time information from a clock installed outside.

Also, it is preferred that a scenery date and time be input to the input unit 14 to display a starry sky at the scenery date and time. In this case, a starry sky at an arbitrary date and time can be displayed.

Figure 7:
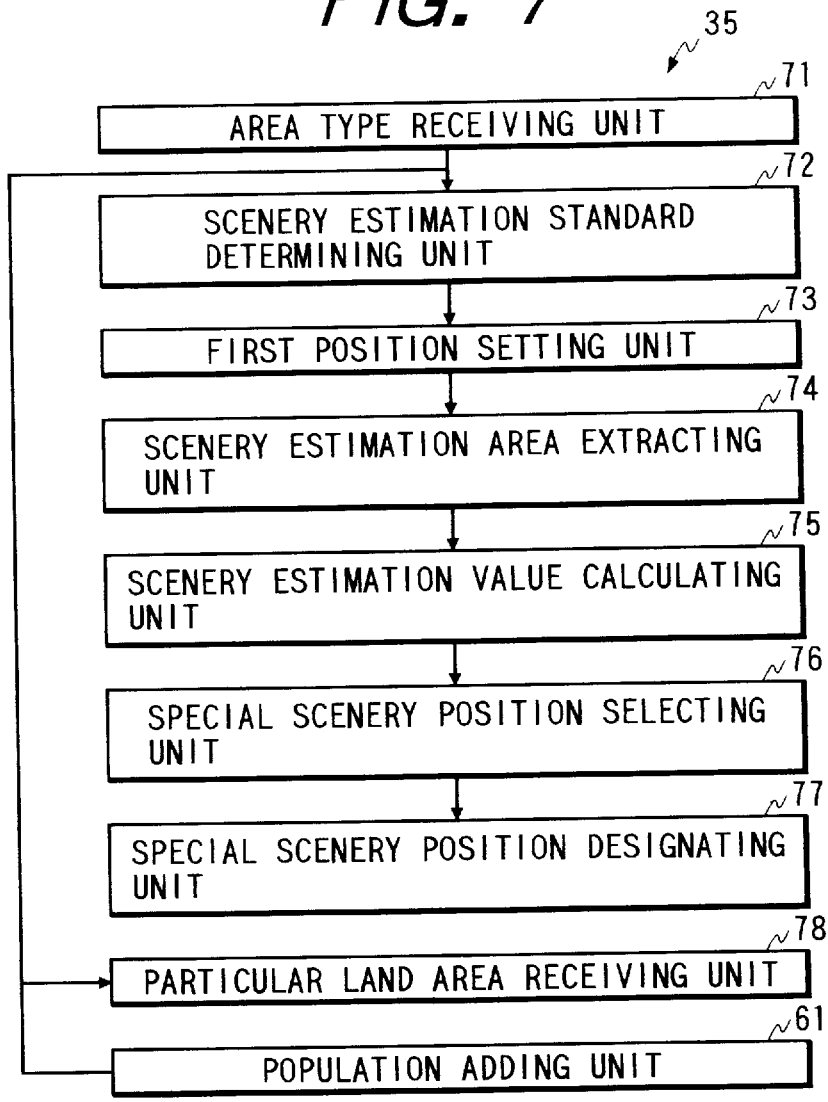
FIG. 7 is a block diagram of a special scenery position designating unit included in the scenery display control unit shown in FIG. 3.

FIG. 7 is a block diagram of the special scenery position designating unit 35.

As shown in FIG. 7, the special scenery position designating unit 35 comprises an area type receiving unit 71 for receiving a type of area input by the operator, a scenery estimation standard determining unit 72 for determining a standard of a scenery estimation according to the type of area received by the area type receiving unit 71, a first position setting unit 73 for setting one or more candidates for a special scenery position informed by the cursor control unit 26 as one or more first positions or setting one or more candidates for a special scenery position placed on a particular road informed by the cursor control unit 26 as one or more first positions and transmitting the first positions to the scenery preparing unit 33 to prepare a scenery from each of the first positions on the displaying unit 21. Also, a scenery estimation area extracting unit 74 extracts a scenery estimation area for each of the sceneries prepared by the scenery preparing unit 33 according to the standard of the scenery estimation determined by the scenery estimation standard determining unit 72, a scenery estimation value calculating unit 75 calculates a scenery estimation value for each of the sceneries prepared by the scenery preparing unit 33 according to the standard of the scenery estimation determined by the scenery estimation standard determining unit 72 and the scenery estimation areas extracted by the scenery estimation area extracting unit 74. Also, a special scenery position selecting unit 76 selects one of the first positions as the special scenery position from among the candidates set by the first position setting unit 73 according to the scenery estimation values calculated by the scenery estimation value calculating unit 75. A special scenery position designating unit 77 designates the special scenery position selected by the special scenery position selecting unit 76 on the planimetric map displayed on the displaying unit 21 by the on-vehicle navigation apparatus 19 or indirectly designates the special scenery position by displaying a specific scenery from the special scenery position on the displaying unit 21, a particular land area receiving unit 78 for receiving a particular land area input to the input unit 14 by the operator, and a population adding unit 61 for adding a population of each city or town to the scenery according to the population information stored in the scenery information data bank 18 to display the scenery including the populations of the cities and towns on the displaying unit 21.

In the above configuration, in cases where the special scenery position designating operation is selected by the operator, the selection of the special scenery position designating operation is recognized by the input operation type recognizing unit 32, and the special scenery position designating unit 35 is operated. In the unit 35, a type of area is input by the operator to the area type receiving unit 71. There are three types of areas in this embodiment.

In a first case, in cases where the operator intends to find out an excellent scenery position placed in a coastal area as a special scenery position, a coastal area is input as a type of area. When a driver passes through a driving course curved along a precipitous cliff in a coastal area such as a Rias coastal area, the driver intends to rest at a parking area from which the driver can directly view a sea at a visibility angle as wide as possible. Therefore, a visibility field of a scenery in which a sea can be directly viewed is determined as a standard of a scenery estimation by the scenery estimation standard determining unit 72. The visibility field is indicated by a unit of squared degree. Thereafter, when a planimetric map is displayed on the displaying unit 21 by the on-vehicle navigation apparatus 19, one or more candidates for a special scenery position are input to the input unit 14 by the operator by selecting the candidates for a special scenery position designated one after another by a cursor displayed on the displaying unit 21 under the control of the cursor control unit 26. In cases where the operator has no idea for selecting candidates for a special scenery position, the operator selects a particular road designated by the cursor, and a candidate for a special scenery position placed on the particular road is automatically determined on every 25 meters. Therefore, the candidates for a special scenery position are set as one or more first positions by the first position setting unit 73, a scenery from each of the first positions is prepared by the scenery preparing unit 33. In this case, any of the sceneries are not displayed on the displaying unit 21. Thereafter, a visibility field determined as the standard of the scenery estimation by the scenery estimation standard determining unit 72 is extracted from each of the sceneries as a scenery estimation area by the scenery estimation area extracting unit 74. Thereafter, a visibility angle area for each of the scenery estimation areas is calculated as a scenery estimation value by the scenery estimation value calculating unit 75 because the visibility field relating to the sea is determined as the standard of the scenery estimation by the scenery estimation standard determining unit 72. Here, for example, in cases where a visibility angle of a rectangular scenery estimation area is 15 degrees in a horizontal direction and is 10 degrees in a perpendicular direction, a visibility angle area for the rectangular scenery estimation area is defined as a product 150 (degree*degree) of the 15 degrees and the 10 degrees. Thereafter, in the special scenery position selecting unit 76, a particular visibility angle area having a maximum value among values of the visibility angle areas is selected, a particular first point relating to the particular visibility angle area is selected as the special scenery position with the most excellent scenery among the candidates. Thereafter, the special scenery position is designated by a special mark on the planimetric map displayed on the displaying unit 21 by the function of the special scenery position designating unit 77, or a scenery viewed from the special scenery position is displayed on the displaying unit 21 to indirectly designate the special scenery position.

Accordingly, the operator can quantitatively estimate the scenery, and the operator can find out a special scenery position with an excellent scenery on the planimetric map as an optimum resting position for entertaining a sea scenery.

In a second case, the operator intends to find out a special scenery position with an excellent scenery in a mountainous area or a green area. In this case, a land area is input as an area type by the operator to the area type receiving unit 71, and a visibility field of a scenery in which one or more mountains or green areas of land can be directly viewed is determined as a standard of a scenery estimation by the scenery estimation standard determining unit 72. Thereafter, the first position setting unit 73 and the scenery estimation area extracting unit 74 are operated in the same manner as in the first case. Thereafter, in the scenery estimation value calculating unit 75, a visibility angle area for each of the scenery estimation areas is calculated and divided into a plurality of units of divided visibility angle areas, and an average of unobstructed view distances from one first position to the divided visibility angle areas is calculated as a scenery estimation value for each of the sceneries because the visibility field relating to the land area is determined as the standard of the scenery estimation by the scenery estimation standard determining unit 72. Thereafter, in the special scenery position selecting unit 76, a particular average unobstructed view distance having a maximum value among values of the average unobstructed view distances is selected, a particular first point relating to the particular average unobstructed view distance is selected as the special scenery position with the most excellent scenery from among the candidates. That is, as a land scenery becomes distant, it is judged that the land scenery becomes more excellent. Thereafter, the special scenery position is designated on the planimetric map displayed on the displaying unit 21 in the same manner.

Accordingly, the operator can quantitatively estimate the scenery, and the operator can determine a special scenery position with an excellent scenery on the planimetric map as an optimum resting position for entertaining a mountainous area or a green area.

In a third case, the operator intends to determine a set-up position of a wireless or relay station in which a ultra short wave or another wave having a shorter wavelength than that of the ultra short wave is used for wireless communication. In case of a television relay station, a scenery position from which a service area having a thick population density can be widely viewed to perfectly transmit a television electric wave to the entire service area is selected as a set-up position. Also, in case of an amateur wireless movable station, a scenery position from which a city area having a thick population density can be widely viewed is selected as a set-up position except for the case that a remote communication using a mountainous propagation is performed. Therefore, a land area is input as an area type by the operator to the area type receiving unit 71, and a visibility field of a scenery in which the land can be directly viewed is determined as a standard of a scenery estimation by the scenery estimation standard determining unit 72. Thereafter, the first position setting unit 73 and the scenery estimation area extracting unit 74 are operated in the same manner as in the first case. Thereafter, in the scenery estimation value calculating unit 75, a visibility angle area for each of the scenery estimation areas is calculated and divided into a plurality of units of divided visibility angle areas, an unobstructed view distance for one unit of divided visibility angle area between one first position corresponding to the unit of divided visibility angle area and a portion of one scenery estimation area corresponding to the unit of divided visibility angle area is calculated according to the scenery information stored in the storing unit 18 for each of the units of divided visibility angle areas. A population for each of the units of divided visibility angle areas is calculated by multiplying one unit of divided visibility angle area, one corresponding unobstructed view distance and one corresponding density of population indicated a piece of population information stored in the storing unit 18 together. A total population for each of the sceneries viewed from the first positions is calculated as a scenery estimation value by adding up the populations for the units of divided visibility angle areas of one visibility angle area. Thereafter, in the special scenery position selecting unit 76, a maximum total population among the total populations is selected, and a particular first position relating to the maximum total population is selected as the special scenery position from among the candidates. Thereafter, the special scenery position is designated on the planimetric map displayed on the displaying unit 21 by the designating unit 77 in the same manner. Also, the maximum total population is indicated in the scenery prepared by the scenery preparing unit 33 by the function of the population adding unit 61.

In cases where the wireless or relay station is set up for people staying in a particular land area, a particular land area is received by the particular land area receiving unit 78, a scenery estimation area is extracted for each of the sceneries by the scenery estimation area extracting unit 74 on the condition that the scenery estimation area exists in the particular land area, and a special scenery position is obtained.

Accordingly, the operator can quantitatively estimate the scenery, and the operator can determine a special scenery position appropriate as a set-up position of a wireless or relay station on the planimetric map.

Also, because a special scenery position is automatically selected from a plurality of candidates for the special scenery position, the special scenery position can be determined at high speed.

Also, because a plurality of candidates for a special scenery position are automatically selected by specifying a particular road, the selection of the candidates can be easily performed. In particular, in cases where the operator drives a vehicle, because the operator passes through a road, the selection of the candidates placed on the road is very useful.

Figure 8:
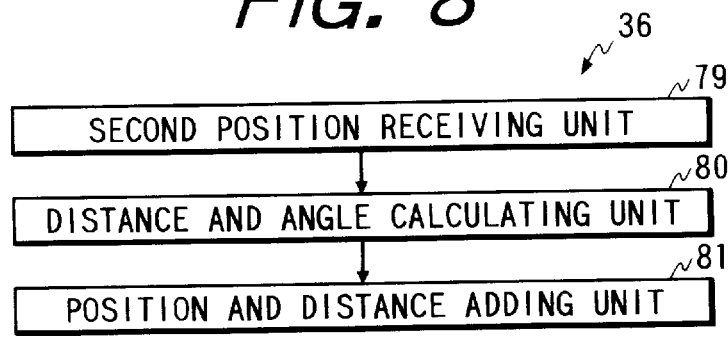
FIG. 8 is a block diagram of a second position display control unit included in the scenery display control unit shown in FIG. 3.

FIG. 8 is a block diagram of the second position display control unit 36.

As shown in FIG. 8, the second position display control unit 36 comprises a second position receiving unit 79 for receiving a second position input to the input unit 14 by the operator, a distance and angle calculating unit 80 for calculating a distance between the current position (or the first position) and the second position received by the receiving unit 79, calculating a particular relative horizontal angle from the current position (or the first position) to the second position and calculating a particular elevation angle of the second position, and a position and distance adding unit 81 for adding a marking arrow indicating the second position and a value of the distance calculated by the calculating unit 80 to the scenery prepared by the scenery preparing unit 33 to display the scenery, in which the marking arrow designating the second position placed at the particular relative horizontal angle and the particular elevation angle and the distance value are indicated, on the displaying unit 21.

Figure 9:
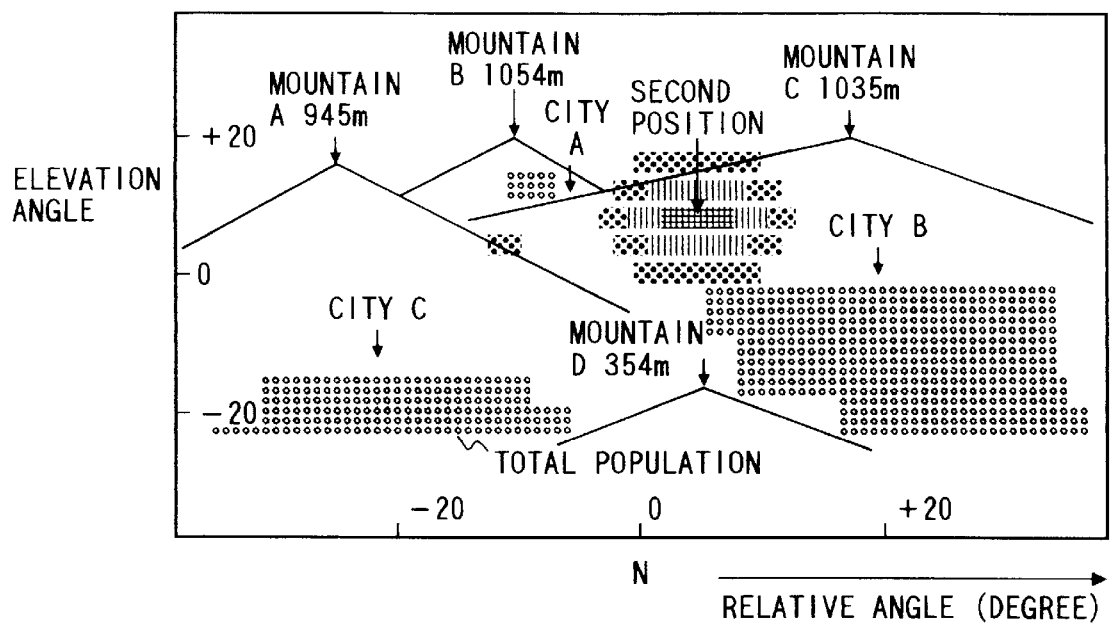
FIG. 9 is a second example of a scenery shown by the scenery displaying system shown in FIG. 1.

In the above configuration, in cases where the second position indicating operation is selected by the operator, the selection of the second position indicating operation is recognized by the input operation type recognizing unit 32, and the second position display control unit 36 is operated. Also, a second position is input to the input unit 14 by the operator. Therefore, the second position input is received by the receiving unit 79, and a marking arrow directed in a lower direction and indicating the second position is displayed on the displaying unit 21 with the scenery by the adding unit 81, as shown in FIG. 9. In cases where the second position is not placed in a perspective area because the second position is hidden behind some object, a marking arrow directed in an upper direction above the second position is displayed on the displaying unit 21 by the adding unit 81. Therefore, the operator can judge whether or not the second position is placed in a perspective area. Also, a relative direction from the current position (or the first position) to the second position can be recognized by referencing a relative horizontal angle just below the marking arrow.

In addition, a distance between the current position (or the first position) and the second position is calculated by the calculating unit 80, and a value of the distance is also displayed on the displaying unit 21 with the scenery by the adding unit 81. Therefore, the operator can recognize the distance.

Accordingly, in cases where the operator driving a vehicle intends to communicate with a partner placing at the second position, because the relative direction is displayed, the driver can easily direct an antenna of the vehicle toward the partner.

Also, because it is difficult to recognize an actual distance in the scenery, the display of the distance value is useful. In addition, because the communication between the operator and the partner depends on the distance, the display of the distance value is also useful.

Figure 10:
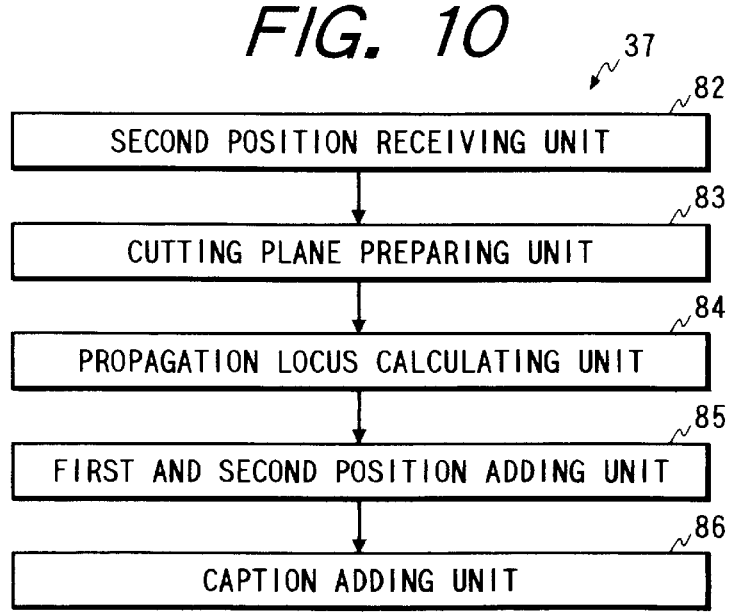
FIG. 10 is a block diagram of a cutting plane display control unit included in the scenery display control unit shown in FIG. 3.

FIG. 10 is a block diagram of the cutting plane display control unit 37.

As shown in FIG. 10, the cutting plane display control unit 37 comprises a second position receiving unit 82 for receiving a second position input to the input unit 14 by the operator, a cutting plane preparing unit 83 for preparing a perpendicular cutting plane taken along the first and second positions according to the contour line information stored in the scenery information storing unit 18, a propagation locus calculating unit 84 for calculating a propagation locus of an electric wave transmitted between the first and second positions received by the receiving unit 82 while considering the diffraction of the electric wave at a mountain in cases where the transmission of the electric wave is disturbed by the mountain, a straight length between the first and second positions and a propagation length of the propagation locus. A first and second position adding unit 85 adds first and second marking arrows designating the first position and second positions, the propagation locus of the electric wave calculated by the calculating unit 84 and a straight line connecting the first and second positions to the perpendicular cutting plane prepared by the producing unit 83 to display the perpendicularly cutting plane including the first and second marking arrows and the propagation locus, and a caption adding unit 86 adds captions such as height levels, the lengths of the propagation locus, a diffraction angle in mountainous propagation of the electric wave and an elevation angle of the electric wave at a diffraction point to the perpendicular cutting plane displayed on the displaying unit 21.

Figure 11:
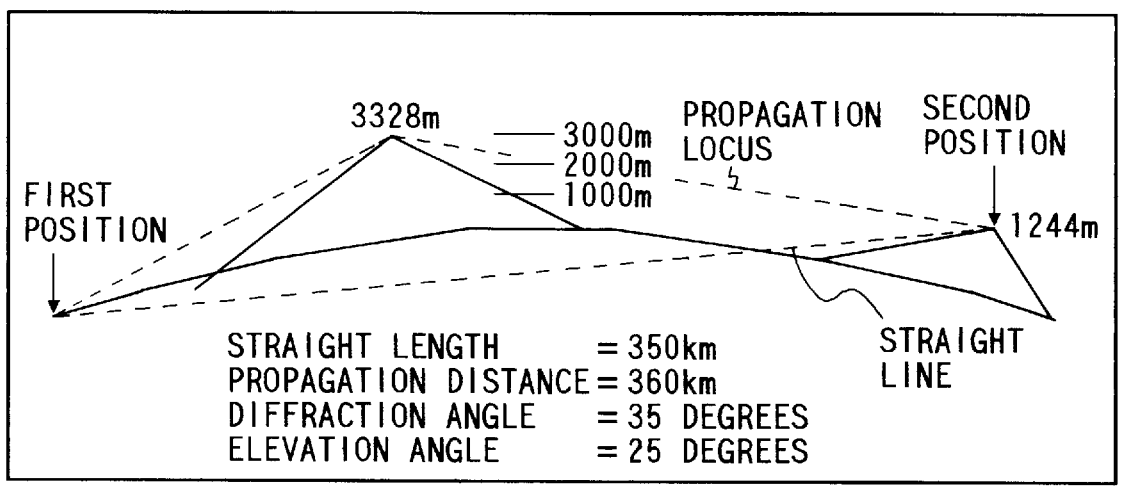
FIG. 11 is an example of a perpendicularly cutting plane shown under control of a cutting plane display control unit included in the scenery display control unit shown in FIG. 3.

In the above configuration, in cases where the cutting plane displaying operation is selected by the operator, the selection of the cutting plane displaying operation is recognized by the input operation type recognizing unit 32, and the cutting plane display control unit 37 is operated. That is, when first and second positions are input to the input unit 14 by the operator, the first and second positions are received by the receiving unit 82, and a perpendicular cutting plane taken along the first and second positions is prepared by the preparing unit 83. Thereafter, a propagation locus of an electric wave transmitted between the first and second positions, a straight length of the propagation locus and a propagation length of the propagation locus are calculated by the calculating unit 84. Thereafter, first and second marking arrows designating the first position and second positions, the propagation locus of the electric wave and a straight line connecting the first and second positions are added to the perpendicular cutting plane by the adding unit 85, and the perpendicular cutting plane is displayed on the displaying unit 21, as shown in FIG. 11. Also, captions such as height levels, the lengths of the propagation locus, a diffraction angle in mountainous propagation of the electric wave and an elevation angle for the second position are added to the perpendicular cutting plane by the adding unit 86. In this case, directions of the first and second marking arrows are determined in the same manner as in the second position indicating operation. Also, in cases where the electric wave is diffracted by a mountain, the propagation locus is expressed by a curved line.

In this embodiment, the first position is input by the operator. However, it is applicable that the current position detected by the detecting device 12 be treated as the first position.

Accordingly, because the perpendicularly cutting plane taken along the first and second positions is displayed, a cross-sectional shape of land between the first and second positions can be easily recognized. Also, in cases where the first and second positions are far from each other, the influence of the roundness of the earth can be recognized.

Also, the judgement whether or not the electric wave can be transmitted between the first and second positions can be easily performed. In cases where the electric wave cannot be transmitted, an altered second position can be easily found out by gradually moving the second position to transmit the electric wave.

Also, because a propagation locus of the electric wave diffracted by a mountain is displayed, conditions of a mountainous propagation can be easily analyzed.

Also, because the straight line connecting the first and second positions is displayed with the cutting plane, a positional relationship between the first and second positions can be easily realized.

Figure 12:
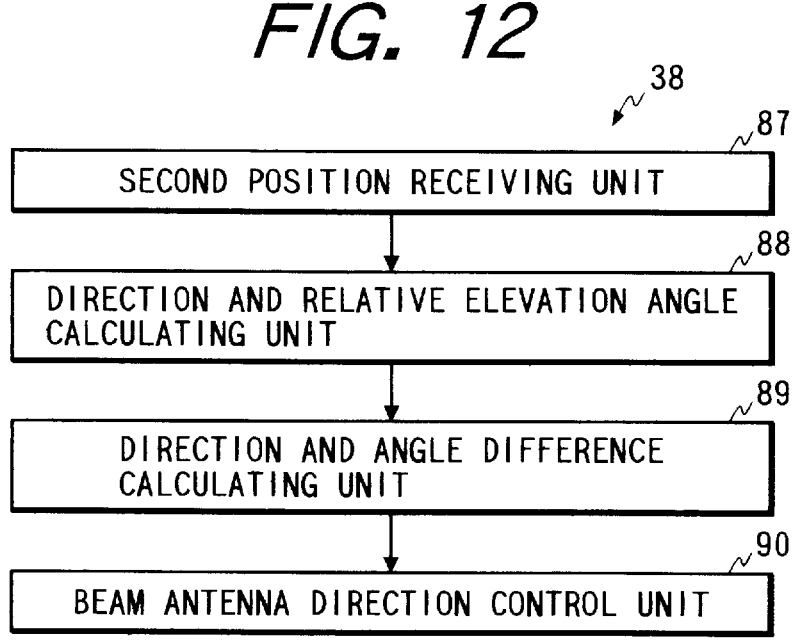
FIG. 12 is a block diagram of a beam antenna direction control unit included in the scenery display control unit shown in FIG. 3.

FIG. 12 is a block diagram of the beam antenna direction control unit 38.

As shown in FIG. 12, the beam antenna direction control unit 38 comprises a second position receiving unit 87 for receiving a second position input to the input unit 14 by the operator, a direction and relative elevation angle calculating unit 88 for calculating a particular relative direction of the second position from the current position and a particular relative elevation angle of the second position from the current position. Also, a direction and angle difference calculating unit 89 calculates a measured relative direction and a measured relative elevation angle of the beam antenna 15 from the current position by using the measured compass direction and the measured elevation angle detected by the beam antenna direction and elevation angle detecting unit 27, calculating a relative direction difference between the particular relative direction calculated by the calculating unit 88 and the measured relative direction and calculating a relative elevation angle difference between the particular relative elevation angle calculated by the calculating unit 88 and the measured relative elevation angle. Also, and a beam antenna direction control unit 90 controls the compass direction and elevation angle of the beam antenna 15 to reduce the relative direction difference and the relative elevation angle difference calculated by the direction and angle difference calculating unit 89 to zero together.

In the above configuration, in cases where the beam antenna direction adjusting operation is selected by the operator, the selection of the beam antenna direction adjusting operation is recognized by the input operation type recognizing unit 32, and the beam antenna direction control unit 38 is operated. In detail, when a second position is input to the input unit 14 by the operator, the second position is received by the receiving unit 87, and a particular relative direction and a particular relative elevation angle of the second position from the current position are calculated by the calculating unit 88. Thereafter, a relative angle difference between the particular relative direction and a measured relative direction of the antenna 15 from the current position obtained from the measured compass direction detected by the detecting unit 27 is calculated by the calculating unit 89. Also, a relative elevation angle difference between the particular relative elevation angle and a measured relative elevation angle of the antenna 15 from the current position obtained from the measured elevation angle detected by the detecting unit 27 is calculated by the calculating unit 89.

Thereafter, the relative direction difference and the relative elevation angle difference are transmitted to the beam antenna actuating unit 22, and the compass direction and the elevation angle of the beam antenna 15 are adjusted by moving the beam antenna 15 with the actuating unit 22 under the control of the beam antenna direction control unit 90 to reduce the relative direction difference and the relative elevation angle difference to zero together. Therefore, the beam antenna 15 is automatically directed toward the second position.

Accordingly, in cases where the operator placed at the current position intends to communicate with a second operator placed at the second position, the beam antenna 15 can always be directed to the second position even though the operator drives a vehicle. Therefore, even though the operator does not know where the second position is actually placed, the operator and the second operator can communicate with each other in good communication conditions.

Figure 13:
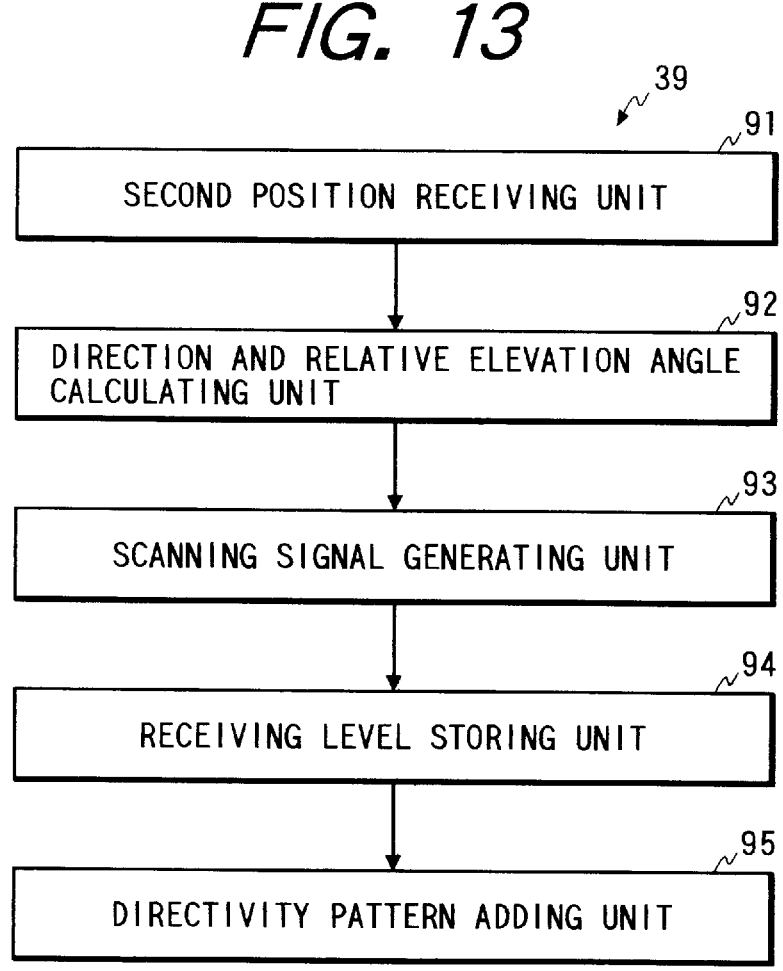
FIG. 13 is a block diagram of a beam antenna receiving pattern display control unit included in the scenery display control unit shown in FIG. 3.

FIG. 13 is a block diagram of the beam antenna receiving pattern display control unit 39.

As shown in FIG. 13, the beam antenna receiving pattern display control unit 39 comprises a second position receiving unit 91 for receiving a second position input to the input unit 14 by the operator, a direction and relative elevation angle calculating unit 92 for calculating a relative direction of the second position from the current position and a relative elevation angle of the second position from the current position, a scanning signal generating unit 93 for generating a scanning signal to scan the beam antenna 15 around the relative direction and the relative elevation angle calculated by the calculating unit 92. Also, a receiving level storing unit 94 stores a receiving level of an electric wave received by the beam antenna 15 on every scanning unit time, and a directivity pattern adding unit 95 reads out the receiving levels stored in the storing unit 94 and adds a directivity pattern of the beam antenna 15 indicated by a pattern of the receiving levels to the scenery prepared by the scenery preparing unit 33.

In the above configuration, in cases where the beam antenna receiving pattern measuring operation is selected by the operator, the selection of the beam antenna receiving pattern measuring operation is recognized by the input operation type recognizing unit 32, and the beam antenna receiving pattern display control unit 39 is operated. In detail, when a second position is input to the input unit 14 by the operator, the second position is received by the receiving unit 91, a relative direction and a relative elevation angle of the second position from the current position are calculated by the calculating unit 92, and a scanning signal indicating the scanning of the beam antenna 15 around the relative direction and the relative elevation angle is generated by the generating unit 93. Thereafter, the beam antenna 15 moved by the beam antenna actuating unit 22 is scanned according to the scanning signal, a receiving level of an electric wave received by the beam antenna 15 is measured by the receiving level measuring device 16 on every scanning unit time, and a plurality of receiving levels are stored in the storing unit 94. In this case, a pattern of the receiving levels indicates a directivity pattern of the beam antenna 15. After the scanning of the beam antenna 15 is finished, the receiving levels are read out, and a pattern of the receiving levels is added to the scenery by the adding unit 95 to display the scenery with a directivity pattern of the beam antenna 15 on the displaying unit 21. An example of the scenery with a directivity pattern of the beam antenna 15 is shown in FIG. 9.

As shown in FIG. 9, the strength of the receiving levels is classified into three strength types, and the three strength types of receiving levels are shown around the second position. Because the electric wave transmitted from the second position is reflected by a mountain A, a low strength type of receiving levels are shown on a side of the mountain A.

Accordingly, a directivity pattern of the beam antenna 15 can be obtained.

Also, in cases where the operator drives a vehicle, a communication condition changing with the movement of the operator can be predicted.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A scenery displaying system, comprising:

first position receiving means for receiving a first position placed on the earth;

scenery information storing means for storing various types of scenery information including shapes of natural objects, data derived from the natural objects, shapes of artificial objects and data derived from the artificial objects;

scenery preparing means for reading a specific type of scenery information of a specific object placed in a specific area viewing from the first position received by the first position receiving means from the scenery information storing means and preparing a scenery from the first position according to the specific type of scenery information, a shape of the specific object and data derived from the specific object being included in the specific type of scenery information; and scenery displaying means for displaying the scenery prepared by the scenery preparing means.

2. A scenery displaying system according to claim 1, in which the scenery information stored in the scenery information storing means is composed of ground information indicating one or more three-dimensional geographical features and positions of natural formations, artificial structure information indicating one or more three-dimensional shapes and positions of artificial structures and name information indicating one or more names of the natural formations, the artificial structures and administrative regions, and the scenery displayed by the scenery displaying means composed of one or more objects selected from the natural formation and the artificial structures, one or more names of objects selected from the natural formation, the artificial structures and the administrative regions.

3. A scenery displaying system according to claim 1, further comprising:

map preparing means for preparing a planimetric map displayed by the displaying means; and first position designating means for designating the first position on the planimetric map prepared by the map preparing means, the first position designated on the planimetric map being received by the first position receiving means.

4. A scenery displaying system according to claim 3 in which the first position designating means is a cursor displayed on the planimetric map or a write pen.

5. A scenery displaying system according to claim 1, further comprising:

compass direction detecting means for detecting a compass direction of the scenery displaying system; and panning operation control means for controlling the preparation of the scenery performed by the scenery preparing means to display the scenery viewed in the compass direction detected by the compass direction detecting means.

6. A scenery displaying system according to claim 1, further comprising:

starry sky display control means for controlling the preparation of the scenery performed by the scenery preparing means to display the scenery in which a time of a sunrise or sunset and a position of the sunrise or sunset are indicated.

7. A scenery displaying system according to claim 1, further comprising:

a global positioning system for detecting a current position of the scenery displaying system as the first position received by the first position receiving means.

8. A scenery displaying system according to claim 1, further comprising:

position and direction detecting means for detecting a current position and a moving direction of the scenery displaying system as the first position received by the first position receiving means and an absolute compass direction; and scenery display control means for controlling the preparation of the scenery performed by the scenery preparing means to display the scenery in which the absolute compass direction detected by the position and direction detecting means and a relative horizontal angle defined as a horizontally shifting angle from the absolute compass direction are indicated.

9. A scenery displaying system according to claim 1, further comprising:

starry sky information storing means for storing starry sky information;

date and time inputting means for inputting a particular date and time; and starry sky display control means for controlling the preparation of the scenery performed by the scenery preparing means to display the scenery in which a starry sky indicated by the starry sky information stored in the starry sky information storing means for the particular date and time input by the date and time inputting means is indicated.

10. A scenery displaying system according to claim 9 in which the date and time inputting means has an internal clock or an external clock for generating a current date and time as the particular date and time.

11. A scenery displaying system according to claim 1, further comprising:

population density storing means for storing a density of population for each of unit areas;

visibility field extracting means for extracting a visibility field, which is defined as a land directly viewed from the first position received by the first position receiving means, from the scenery prepared by the scenery preparing means;

visibility angle area calculating means for calculating a visibility angle area of the visibility field extracted by the visibility field extracting means and dividing the visibility angle area into a plurality of unit visibility angle areas, the visibility angle area being defined as a product of a horizontal visibility angle at the first position in a horizontal direction and a perpendicular visibility angle at the first position in a perpendicular direction;

unobstructed view distance calculating means for calculating an unobstructed view distance between the first position and a portion of the visibility field corresponding to one unit visibility angle area according to the scenery information stored in the scenery information storing means for each of the unit visibility angle areas obtained by the visibility angle area calculating means;

population calculating means for calculating a population by multiplying one unit visibility angle area obtained by the visibility angle area calculating means, one corresponding unobstructed view distance calculated by the unobstructed view distance calculating means and one corresponding density of population stored in the population density storing means together for each of the unit visibility angle areas and calculating a total population in the visibility field by adding up the populations for the unit visibility angle areas; and population display control means for controlling the preparation of the scenery performed by the scenery preparing means to display the scenery in which the total population calculated by the population calculating means is indicated.

12. A scenery displaying system according to claim 1, further comprising:

population density storing means for storing a density of population for each of unit areas;

special scenery position candidate setting means for setting a plurality of candidates for a special scenery position, a plurality of inspected sceneries from the inspected positions being prepared by the scenery preparing means;

visibility field extracting means for extracting a visibility field, which is defined as a land directly viewed from each of the inspected positions set by the special scenery position candidate setting means, from each of the inspected sceneries;

visibility angle area calculating means for calculating a plurality of visibility angle areas of the visibility fields extracted by the visibility field extracting means and dividing each of the visibility angle areas into a plurality of unit visibility angle areas, each of the visibility angle areas at the inspected positions being defined as a product of a horizontal visibility angle in a horizontal direction and a perpendicular visibility angle in a perpendicular direction;

unobstructed view distance calculating means for calculating an unobstructed view distance for one unit visibility angle area between one inspected position corresponding to the unit visibility angle area and a portion of one visibility field corresponding to the unit visibility angle area according to the scenery information stored in the scenery information storing means for each of the unit visibility angle areas obtained by the visibility angle area calculating means;

population calculating means for calculating a population by multiplying one unit visibility angle area obtained by the visibility angle area calculating means, one corresponding unobstructed view distance calculated by the unobstructed view distance calculating means and one corresponding density of population stored in the population density storing means together for each of the unit visibility angle areas and calculating a total population by adding up the populations for the unit visibility angle areas of one visibility angle area for each of the inspected positions;

special scenery position selecting means for selecting a particular inspected position corresponding to a maximum total population among the total populations calculated by the population calculating means as the special scenery position from among the inspected positions; and population display control means for controlling the preparation of the scenery performed by the scenery preparing means to display the scenery viewed from the special scenery position selected by the special scenery position selecting means in which the maximum total population calculated by the population calculating means is indicated.

13. A scenery displaying system according to claim 12 in which the special scenery position candidate setting means comprises a particular road receiving unit for receiving a particular road; and candidate setting unit for setting a plurality of inspected positions placed at predetermined intervals on the particular road received by the particular road receiving unit as the candidates for the special scenery position.

14. A scenery displaying system according to claim 1, further comprising:

second position receiving means for receiving a second position;

distance calculating means for calculating a particular distance between the first position received by the first position receiving means and the second position received by the second position receiving means;

relative angle calculating means for calculating a particular relative horizontal angle from the first position received by the first position receiving means to the second position received by the second position receiving means;

elevation angle calculating means for calculating a particular elevation angle of the second position received by the second position receiving means; and position and distance adding means for adding the second position received by the second position receiving means to the scenery prepared by the scenery preparing means to display the scenery in which the particular distance calculated by the distance calculating means and the second position placed at the particular relative horizontal angle calculated by the relative angle calculating means and the particular elevation angle calculated by the elevation angle calculating means are indicated.

15. A scenery displaying system according to claim 1, further comprising:

second position receiving means for receiving a second position;

cutting plane preparing means for preparing a perpendicular cutting plane taken along the first position received by the first position receiving means and the second position received by the second position receiving means according to the scenery information stored in the scenery information storing means; and display control means for controlling the scenery displaying means to display the perpendicular cutting plane prepared by the cutting plane preparing means.

16. A scenery displaying system according to claim 15, further comprising:

propagation locus calculating means for calculating a propagation locus of an electric wave transmitted between the first position received by the first position receiving means and the second position received by the second position receiving means; and propagation locus curving means for curving the propagation locus calculated by the propagation locus calculating means to diffract the electric wave at a natural formation indicated by the scenery information stored in the scenery information storing means in cases where the transmission of the electric wave is disturbed by the natural formation, the propagation locus curved being indicated on the perpendicular cutting plane displayed under control of the display control means.

17. A scenery displaying system according to claim 16, further comprising:

straight length calculating means for calculating a straight length between the first position received by the first position receiving means and the second position received by the second position receiving means;

propagation length calculating means for calculating a propagation length of the propagation locus curved by the propagation locus curving means;

elevation angle calculating means for calculating a particular elevation angle of the propagation locus curved by the propagation locus curving means at a diffraction position of the electric wave; and caption adding means for adding the straight length calculated by the straight length calculating means, the propagation length calculated by the propagation length calculating means and the particular elevation angle calculated by the elevation angle calculating means to the perpendicular cutting plane displayed by the scenery displaying means.

18. A scenery displaying system according to claim 1, further comprising:

special scenery position candidate setting means for setting a plurality of candidates for a special scenery position as a plurality of inspected positions, a plurality of inspected sceneries from the inspected positions being prepared by the scenery preparing means;

visibility field extracting means for extracting a visibility field, which is defined as a natural formation directly viewed from each of the inspected positions set by the special scenery position candidate setting means, from each of the inspected sceneries;

visibility angle area calculating means for calculating a plurality of visibility angle areas of the visibility fields extracted by the visibility field extracting means, each of the visibility angle areas at the inspected positions being defined as a product of a horizontal visibility angle in a horizontal direction and a perpendicular visibility angle in a perpendicular direction;

special scenery position selecting means for selecting a particular inspected position corresponding to a maximum visibility angle area among the visibility angle areas calculated by the visibility angle area calculating means as the special scenery position from among the inspected positions; and special scenery position display control means for controlling the preparation of the scenery performed by the scenery preparing means to display the scenery viewed from the special scenery position selected by the special scenery position selecting means.

19. A scenery displaying system according to claim 18 in which the special scenery position candidate setting means comprises a particular road receiving unit for receiving a particular road; and candidate setting unit for setting a plurality of inspected positions placed at predetermined intervals on the particular road received by the particular road receiving unit as the candidates for the special scenery position.

20. A scenery displaying system according to claim 1, further comprising:

special scenery position candidate setting means for setting a plurality of candidates for a special scenery position as a plurality of inspected positions, a plurality of inspected sceneries from the inspected positions being prepared by the scenery preparing means;

visibility field extracting means for extracting a visibility field, which is defined as a natural formation directly viewed from each of the inspected positions set by the special scenery position candidate setting means, from each of the inspected sceneries;

visibility angle area calculating means for calculating a plurality of visibility angle areas of the visibility fields extracted by the visibility field extracting means and dividing each of the visibility angle areas into a plurality of unit visibility angle areas, each of the visibility angle areas at the inspected positions being defined as a product of a horizontal visibility angle in a horizontal direction and a perpendicular visibility angle in a perpendicular direction;

unobstructed view distance calculating means for calculating an unobstructed view distance for one unit visibility angle area between one inspected position corresponding to the unit visibility angle area and a portion of one visibility field corresponding to the unit visibility angle area according to the scenery information stored in the scenery information storing means for each of the unit visibility angle areas obtained by the visibility angle area calculating means;

average unobstructed view distance calculating means for calculating an average of the unobstructed view distances calculated by the unobstructed view distance calculating means and corresponding to one visibility angle area for each of the visibility angle areas;

special scenery position selecting means for selecting one inspected position corresponding to a maximum average among the averages calculated by the average unobstructed view distance calculating means as the special scenery position from among the inspected positions; and special scenery position display control means for controlling the preparation of the scenery performed by the scenery preparing means to display the scenery viewed from the special scenery position selected by the special scenery position selecting means.

21. A scenery displaying system according to claim 20 in which the special scenery position candidate setting means comprises a particular road receiving unit for receiving a particular road; and candidate setting unit for setting a plurality of inspected positions placed at predetermined intervals on the particular road received by the particular road receiving unit as the candidates for the special scenery position.

22. A scenery displaying system, comprising:

first position receiving means for receiving a first position;

scenery information storing means for storing scenery information;

scenery display control means for controlling display of a scenery viewed from the first position received by the first position receiving means according to the scenery information stored in the scenery information storing means; and scenery displaying means for displaying the scenery under control of the scenery display control means, the scenery display control means comprising natural formation adding means for adding one or more contours of natural formations to the scenery;

artificial structure adding means for adding one or more contours of artificial structures to the scenery; and name adding means for adding one or more names of the natural formations, the artificial structures and administrative regions to the scenery, the scenery in which the contours of the natural formations added by the natural formation adding means, the contours of the artificial structures added by the artificial structure adding means and the names added by the name adding means are indicated being displayed by the scenery displaying means.

23. A scenery displaying system according to claim 22 in which the scenery display control means further comprises starry sky adding means for adding a starry sky to the scenery displayed by the scenery displaying means; and earth orbital locus adding means for adding an earth orbital locus of the sun to the scenery displayed by the scenery displaying means and adding a sunrise or sunset time and a position of the sunrise or sunset to the scenery displayed by the scenery displaying means.

24. A scenery displaying system according to claim 22 in which the scenery display control means further comprises area type receiving means for receiving a type of area;

scenery estimation standard determining means for determining a standard of a scenery estimation according to the type of area received by the area type receiving means;

candidate setting means for setting a plurality of candidates for a special scenery position or setting a plurality of candidates for a special scenery position placed on a particular road as a plurality of inspected positions, a plurality of inspected sceneries viewed from the inspected positions being prepared by the natural formation adding means, the artificial structure adding means and the name adding means;

scenery estimation area extracting means for extracting a scenery estimation area for each of the sceneries viewed from the inspected positions set by the candidate setting means according to the standard of the scenery estimation determined by the scenery estimation standard determining means;

scenery estimation value calculating means for calculating a scenery estimation value for each of the sceneries viewed from the inspected positions set by the candidate setting means according to the standard of the scenery estimation determined by the scenery estimation standard determining means and the scenery estimation areas extracted by the scenery estimation area extracting means;

special scenery position selecting means for selecting one inspected position corresponding to a particular scenery estimation value having a maximum value among the scenery estimation values calculated by the scenery estimation value calculating means as the special scenery position from among the inspected positions set by the candidate setting means; and special scenery position designating means for designating the special scenery position selected by the special scenery position selecting means in the scenery displayed by the scenery displaying means.

25. A scenery displaying system according to claim 22 in which the scenery display control means further comprises second position receiving means for receiving a second position;

distance and angle calculating means for calculating a distance between the first position received by the first position receiving means and the second position received by the second position receiving means, calculating a particular relative horizontal angle from the first position to the second position and calculating a particular elevation angle of the second position; and position and distance adding means for adding the second position placed at the particular relative horizontal angle and the particular elevation angle calculated by the distance and angle calculating means and the distance calculated by the distance and angle calculating means to the scenery.

26. A scenery displaying system according to claim 22 in which the scenery display control means further comprises second position receiving means for receiving a second position cutting plane preparing means for preparing a perpendicular cutting plane taken along the first position received by the first position receiving means and the second position received by the second position receiving means according to the scenery information stored in the scenery information storing means;

propagation locus calculating means for calculating a propagation locus of an electric wave which is transmitted between the first position received by the first position receiving means and the second position received by the second position receiving means and is curved at a diffraction point, a straight length between the first and second positions and a propagation length of the propagation locus; and propagation locus adding means for adding the propagation locus of the electric wave, the straight length and the propagation length calculated by the propagation locus calculating means to the scenery.

27. A scenery displaying system according to claim 22, further comprising:

a beam antenna;

beam antenna actuating means for moving the beam antenna under control of the scenery display control means; and beam antenna direction and elevation angle detecting means for detecting a compass direction and an elevation angle of the beam antenna moved by the beam antenna actuating means, and the scenery display control means further comprising second position receiving means for receiving a second position;

direction and elevation angle calculating means for calculating a particular relative direction of the second position from the first position and a particular relative elevation angle of the second position from the first position;

direction and elevation angle difference calculating means for calculating a measured relative direction and a measured relative elevation angle of the beam antenna from the first position according to the compass direction and the elevation angle detected by the beam antenna direction and elevation angle detecting means, calculating a relative direction difference between the particular relative direction calculated by the direction and elevation angle calculating means and the measured relative direction and calculating an elevation angle difference between the particular relative elevation angle calculated by the direction and elevation angle calculating means and the measured relative elevation angle; and beam antenna direction control means for controlling a compass direction and an elevation angle of the beam antenna to reduce the relative direction difference and the elevation angle difference calculated by the direction and elevation angle difference calculating means to zero together.

28. A scenery displaying system according to claim 22, further comprising:

a beam antenna for receiving an electric wave;

beam antenna actuating means for moving the beam antenna under control of the scenery display control means;

beam antenna direction and elevation angle detecting means for detecting a compass direction and an elevation angle of the beam antenna moved by the beam antenna actuating means; and receiving level measuring means for measuring a receiving level of the electric wave received by the beam antenna, and the scenery display control means further comprising second position receiving means for receiving a second position;

direction and elevation angle calculating means for calculating a relative direction of the second position from the first position and a relative elevation angle of the second position from the first position;

scanning signal generating means for generating a scanning signal to scan the beam antenna around the relative direction and the relative elevation angle calculated by the direction and elevation angle calculating means;

receiving level storing means for storing the receiving level of the electric wave measured by the receiving level measuring means on every scanning unit time during the scanning of the beam antenna performed according to the scanning signal generated by the scanning signal generating means; and directivity pattern adding means for adding a directivity pattern of the beam antenna indicated by a pattern of the receiving levels stored in the receiving level storing means to the scenery.

* * * * *